E. R. JANES AND C. H. ADAMS.
HEDGE AND LIKE TRIMMING APPARATUS.
APPLICATION FILED OCT. 8, 1920.

1,426,989.  Patented Aug. 22, 1922.

Inventors
Edwyn R. Janes
Charles H. Adams

UNITED STATES PATENT OFFICE.

EDWIN RIDGWAY JANES AND CHARLES HUBERT ADAMS, OF READING, ENGLAND.

HEDGE AND LIKE TRIMMING APPARATUS.

1,426,989.          Specification of Letters Patent.    Patented Aug. 22, 1922.

Application filed October 6, 1920. Serial No. 415,671.

*To all whom it may concern:*

Be it known that EDWIN RIDGWAY JANES and CHARLES HUBERT ADAMS, subjects of the King of Great Britain, residing at Reading, England, have invented certain new and useful Improvements in Hedge and like Trimming Apparatus, of which the following is a specification.

This invention relates to hedge and like trimming apparatus which is held by hand or otherwise and actuated by manual or mechanical power through a flexible or universal shaft or cable and has for its object to construct such apparatus in a greatly improved manner whereby a better, simpler and greatly accelerated cutting of the hedge is obtained by convenient manipulation of the apparatus.

For the purpose of our invention we employ as the cutting means a rotatable circular saw or a sharp edge cutter carried in a casing having openings and fingers or guides for directing the material being cut to the saw or cutter, and for maintaining it in position during cutting, the saw or cutter being driven by a flexible or universal shaft or cable, or by a belt, extensible or otherwise, from any prime mover, or by hand or foot power, or by an electric motor built in or attached direct to the casing, the power for the electric motor being supplied through flexible wire from a main or an electric generator. A friction or other clutch is interposed between the saws or cutters and motive power, which clutch can be actuated automatically, or by the operator, should the saw or cutter bind or come against a hard substance, and so prevent it being damaged. If an electric motor is employed a switch may take the place of the clutch.

A handle or handles may be provided by which the apparatus can be manipulated, one or more of which may be adjustable for ease in cutting the various parts of a hedge or the like.

As an example of our invention we will describe our preferred construction of apparatus, as illustrated on the annexed drawings in which:—

Figure 1:
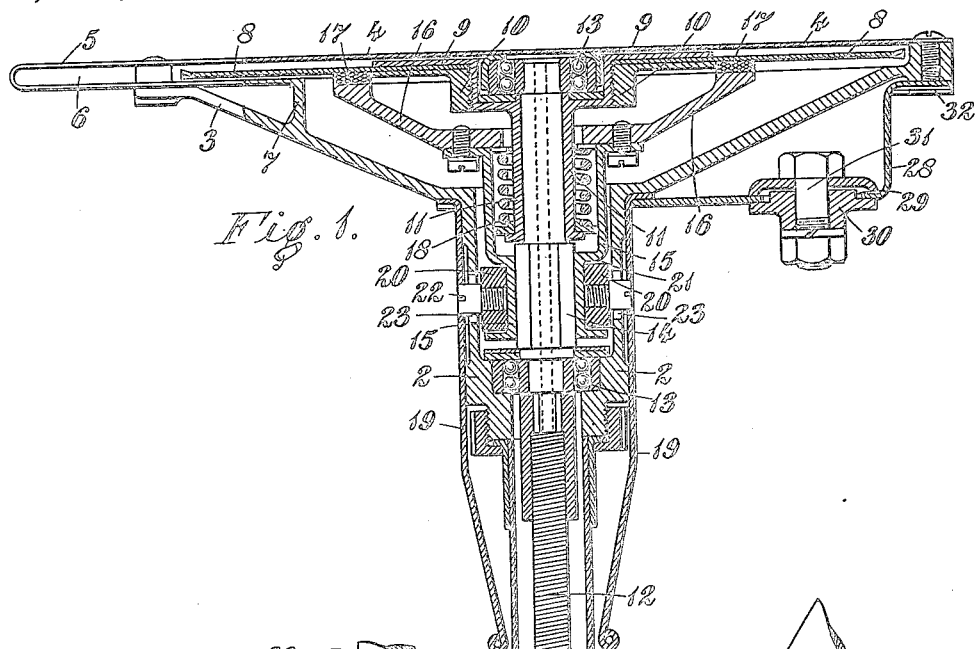

Figure 1 is a sectional elevation of one form of apparatus.

Figure 2:
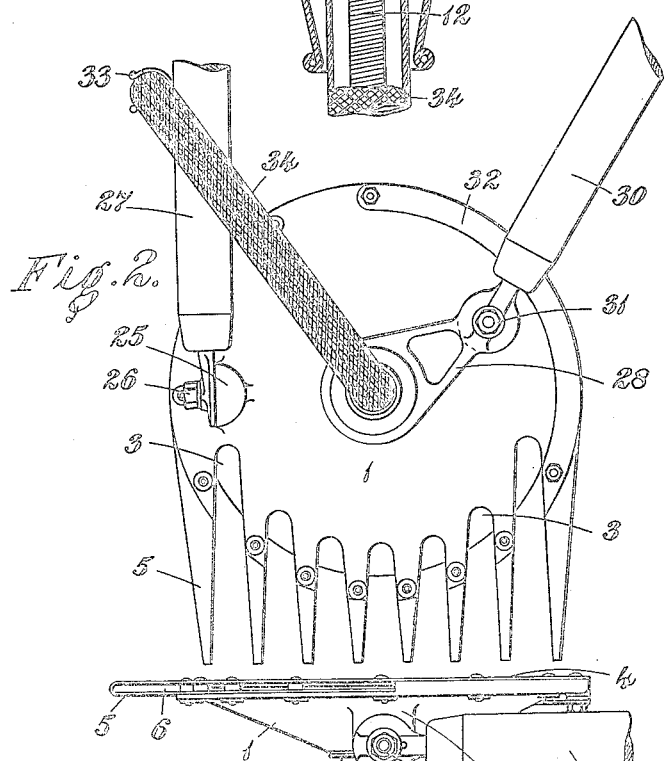
Figure 3:
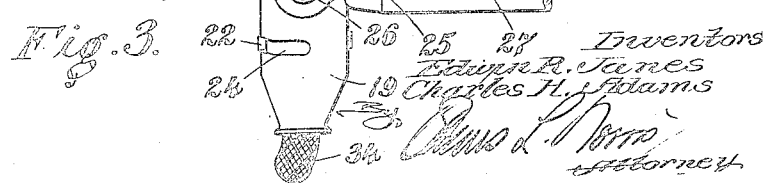

Figure 2 an under plan view and Figure 3 a side elevation of same.

We construct a flattened cone-shaped casing 1 from the apex of which projects a tubular extension piece 2, and around a part of the periphery of the base we form a series of recesses or cut away portions 3 and cover the base with a plate or disc 4 having on part of its circumference projecting pieces or strips 5 in the plane of the disc. These strips 5 are preferably bent over on themselves to form a gap 6 and have their free ends secured within the casing 1, the projecting pieces or strips 5 being so arranged that they coincide with the portions of the casing between the recesses or cut away portions 3 and act as fingers or guides to direct and maintain the hedge or other vegetation being cut in the recesses 3. The casing 1 is provided on its inside with a rib 7 or extension against which the inner ends of the fingers 5 abut, which rib 7 further prevents cut portions of the hedge or foreign matter from entering and clogging the mechanism.

The circular saw or cutter 8 is carried by a bearing plate 9. This bearing plate 9, in the present instance, is shown as having a centrally disposed externally threaded boss which extends through a central opening in the saw or cutter 8 and as being secured to the latter by a locking ring 10 mounted on said threaded boss and engaging the opposite side of the saw or cutter 8. The bearing plate 9 has a sleeve depending from said boss and which is loosely mounted on the end of a driving shaft 11 which is located at the centre of the base plate or disc 4 of the casing 1. The shaft 11 passes up through the tubular extension 2 of the casing 1 and is connected to the upper end of a flexible driving shaft 12, ball or roller bearings 13 being provided for the shaft 11.

The bearing plate 9 and saw or cutter 8 are positioned near the plate 4 of the casing 1 and the saw or cutter 8 is only slightly smaller in diameter than the inside of the casing 1 and projects into the gap 6 formed by the bending over of the projecting pieces or strips 5 of the base plate 4. The driving shaft 11 is formed with a square or equivalent shaped portion 14. Mounted to slide on the portion 14 of the shaft 11 is a collar 15 having a coned or dished ring extension piece 16, the base of which carries a friction ring 17 which is positioned to be held in frictional engagement with the saw 8 by a spring 18 positioned between the extension piece 16 and a flange on the end of the sleeve of the bearing plate 9.

A tubular sleeve piece 19 which may form a handle is positioned over the tubular extension 2 of the casing 1 and through it passes the flexible driving shaft 12. The sleeve piece 19 is rotatable on the extension piece 2 and is connected to a thrust ring 20 in a race or groove 21 in the friction ring collar 15 by pins 22, or the like which pass through longitudinal slots 23 in the tubular extension 2 of the casing 1, and also through inclined slots 24 in the tubular sleeve piece 19. The slots 24 act as a face cam, so that when the sleeve 19 is rotated the pins 22 will ride up the slots 23 and 24 and force the friction ring 17 away from the saw 8 against the action of the spring 18 and thus disengage the extension piece 16 from the saw or cutter 8.

Suitable bearings, collars and distance pieces are interposed between the various parts and the tubular extension of the casing to hold all parts in place to ensure the proper running of the apparatus, as will be well understood.

A projection piece or lug 25 having a plain or serrated face is formed upon the outside of the casing 1, and to said projection a handle 27 having a corresponding plain or serrated piece is secured as by means of a bolt and nut 26 so that the handle 27 can be adjusted in relation to the casing 1 and held rigid when the bolt is tightened up.

In use the saw or cutter 8 is revolved through the flexible shaft 12 by any desired prime mover such as a small petrol or electric motor, or by hand or foot operated apparatus, the operator holding the apparatus by the adjustable handle 27 in one hand and the tubular sleeve 19 in the other. The spring 18 maintains the extension piece 16 and friction ring 17 in engagement with the saw or cutter 8 so as to impart movement to the latter from the flexible shaft 12 and shaft 11 and the apparatus is manipulated so as to cause the branches or twigs of the hedge or other vegetation to enter in between the fingers 5 on to the saw or cutter 8, but should the saw or cutter 8 bind or come against a hard substance such as wire, the saw 8 will slip automatically or the operator by partially rotating the sleeve 19 may disengage the extension piece 16 and friction ring 17 from the saw or cutter 8 and so disconnect the driving force therefrom.

The above described method of holding the apparatus is the most convenient for cutting the sides of hedges or any vertical faces of vegetation, but for cutting hedge tops or any horizontal faces of vegetation or where the operator has to stretch it is more convenient to employ two adjustable handles and for this purpose we may form or connect the tubular sleeve 19 with a bracket or extension piece 28 which has a plain or serrated lug or a hole 29 to which can be connected another handle 30 by a washer and bolt and nut 31.

The end of the bracket 28 is bent or formed to pass under a bridge piece 32 secured on or adjacent to the edge of the casing 1 so that the bracket 28 can be moved around the casing 1 by the handle 30 and thus rotate the tubular sleeve 19 to operate the friction ring 17 in the same manner as before described.

The adjustable handles 27, 30 are of any suitable length and may be provided with clips 33 to engage and hold the flexible shaft casing 34 so as to prevent it from being bent sufficiently to prevent its proper working.

What we do claim as our invention and desire to secure by Letters Patent, is:—

1. A hedge trimming apparatus comprising a casing, a cutter rotatably mounted in said casing, rotary actuating means movable into and out of operative engagement with said cutter, and flexible driving means operatively connected with said actuating means.

2. A hedge trimming apparatus comprising a casing, a cutter rotatably mounted in said casing, a friction clutch movable into and out of operative engagement with said cutter, cam means for moving said clutch, and a driving shaft connected with said clutch.

3. A hedge trimming apparatus comprising a casing having a tubular stem extending therefrom and a series of fingers extending outwardly from its periphery to receive between them the twigs to be cut, a circular cutter rotatably mounted in the casing, a driving shaft, a clutch in said casing between the driving shaft and said cutter, and a sleeve associated with said clutch and shiftable on the stem of the casing for disengaging said clutch from said cutter.

4. A hedge trimming apparatus comprising a casing having a tubular stem extending therefrom and provided with a series of fingers to receive twigs therebetween, a rotatable cutter in said casing movable across the spaces between said fingers, a driving shaft mounted to rotate in said tubular stem, a clutch associated with said shaft and normally engaging said cutter, a sleeve shiftably mounted on said tubular stem, and a connection between said sleeve and said clutch for disengaging said clutch when said sleeve is shifted.

5. A hedge trimming apparatus comprising a casing having a tubular stem extending therefrom and provided with a series of fingers to receive twigs therebetween, a rotatable cutter in said casing movable across the spaces between said fingers, a driving shaft mounted to rotate in said tubular stem, a clutch between said shaft and said cutter, a handle movably mounted on said casing and a connection between said handle and said clutch for disengaging the clutch from the cutter when said handle is actuated.

In testimony whereof we have hereunto set our hands in presence of two subscribing witnesses.

EDWIN RIDGWAY JANES.
CHARLES HUBERT ADAMS.

Witnesses:
G. GORDON COXWELL,
DONALD F. DAVIS.